United States Patent [19]
Heffler

[11] 4,009,012
[45] Feb. 22, 1977

[54] FILTER ELEMENT RETAINER CONSTRUCTION

[76] Inventor: Martin Heffler, 6202 Oxford Ave., Philadelphia, Pa. 19111

[22] Filed: Oct. 20, 1975

[21] Appl. No.: 623,573

[52] U.S. Cl. .............................. 55/483; 24/73 PC; 24/81 BF
[51] Int. Cl.² ................. B01D 50/00; B01D 59/50; A44B 21/00
[58] Field of Search ...... 24/73 PC, 81 BF, DIG. 29; 55/DIG. 31, 497, 501, 511, 483, 484

[56] References Cited
UNITED STATES PATENTS

| | | | |
|---|---|---|---|
| 3,058,279 | 10/1962 | Metcalfe | 55/DIG. 31 |
| 3,250,063 | 5/1966 | Andrews | 55/483 |
| 3,430,771 | 3/1969 | Dreher | 55/501 |

FOREIGN PATENTS OR APPLICATIONS 1,343,651  10/1972  United Kingdom ............... 24/73 B Primary Examiner—Werner H. Schroeder
Assistant Examiner—Doris L. Troutman
Attorney, Agent, or Firm—Robert K. Youtie

[57] ABSTRACT

Improvements in filter banks wherein a framework having plural openings is provided with filter elements in respective openings, holding elements in bearing engagement with marginal regions of the filter elements, and releasable gripping means attached to the holding elements in releasable gripping relation with an adjacent framework portion to removably retain the holding elements in holding position.

9 Claims, 4 Drawing Figures

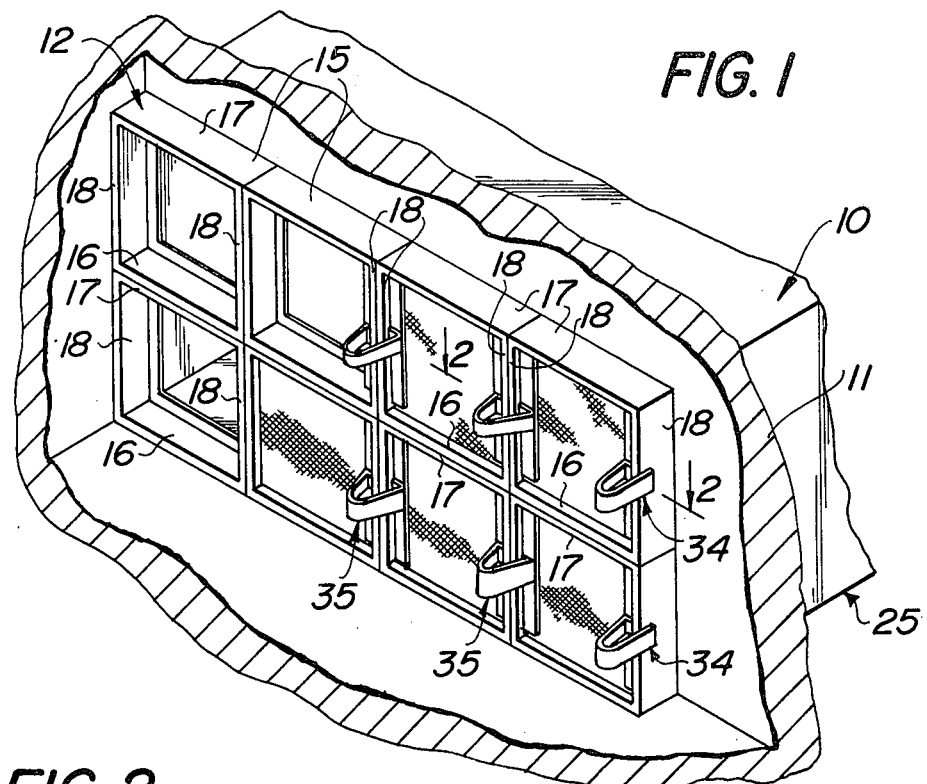
FIG. 1
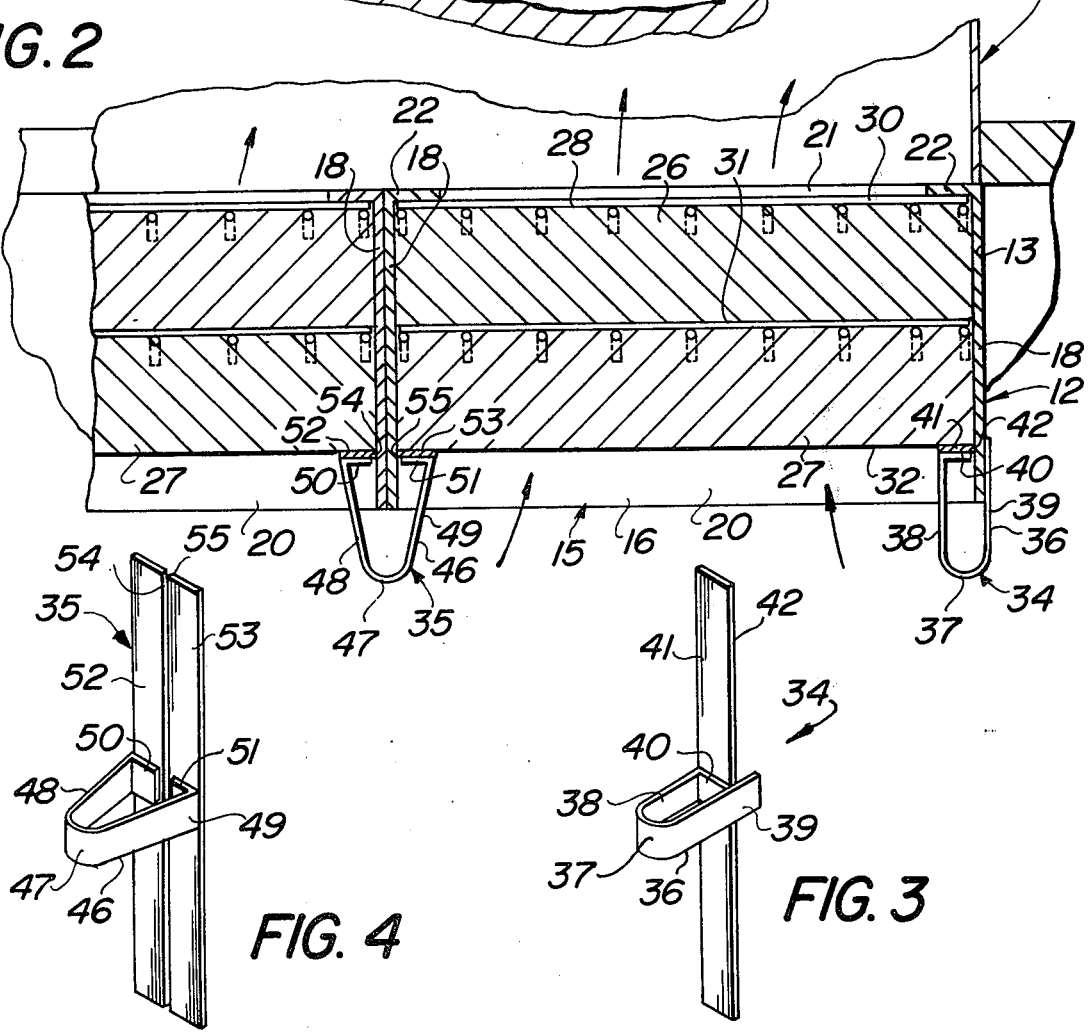
FIG. 2
FIG. 4
FIG. 3

FILTER ELEMENT RETAINER CONSTRUCTION

BACKGROUND OF THE INVENTION

This invention is concerned with filter banks without regard to the material being removed, including filter banks to remove paint overspray, dust, and other. Such filter banks generally include an openwork frame, such as a grid framework having a plurality of openings, suitable filter elements, say of pervious sheeting, pad material or matting, being removably located in and extending across respective framework openings. As these filter elements, by the nature of the process, collect paint, dust or other material on the upstream or intake side thereof, their removal and replacement must be regularly accomplished to maintain proper operation. Heretofore, the procedures necessarily involved in such removal and replacement have been relatively difficult, tedious and time-consuming, as the filter element holding devices have been relatively complex in structure and difficult to remove and replace, often being subject to undesirable sticking or locking, as by the action of dried paint, or the like.

SUMMARY OF THE INVENTION

It is, therefore, an important object of the present invention to provide, in a filter bank, a uniquely simple structural improvement in the removable and replaceable holding of filter elements, particularly including holding members for marginal edge holding engagement with filter elements, and releasable gripping means carried by the holding members for releasable gripping engagement with the filter bank framework.

It is a more particular object of the present invention to provide a filter element retaining structure for a filter bank, wherein at least one elongate holding element or bar is in bearing engagement with the upstream face of a filter element along a marginal edge thereof to retain the filter element in operative position, and resilient clip means is carried by the holding element for releasable frictional retaining engagement with the adjacent portion of the open framework.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

BRIEF DESCRIPTION OF THE DRAWINGS

FIG. 1 is a perspective elevational view showing a filter bank including the improvements of the present invention, looking downstream, with certain filter element receiving openings unoccupied, as during the removal and replacement of filter elements.

FIG. 2 is a partial horizontal sectional view, taken generally along the line 2—2 of FIG. 1.

FIG. 3 is a perspective view showing a filter element retainer structure of the present invention.

FIG. 4 is a perspective view showing a modified filter element retainer of the present invention.

DESCRIPTION OF THE PREFERRED EMBODIMENTS

Referring now more particularly to the drawings, and specifically to FIG. 1 thereof, a filter bank is there generally designated 10, and may be located in a wall 11, as extending therethrough.

The filter bank may include an openwork structure 12, such as an open framework or grid structure having a plurality of openings or passageways therethrough.

In particular, the framework 12 may be composed of a plurality of substantially identical, open rectangular bodies 15 arranged in generally coplanar, side-by-side relation to define the open grid-like framework 12. The rectangularly configured bodies 15, which in conventional usage are usually square, may each include a generally horizontal lower wall 16, a generally horizontal upper wall 17 spaced over the lower wall, and a pair of generally vertical side walls 18 upstanding between the lower and upper walls. The adjacent side walls of proximate rectangular members 15 may be suitably secured together, as by welding or otherwise, and as a unit located in the opening 13 of wall 11.

Each rectangular element 15 of the framework 12 defines therewithin a through opening 20, which openings are each of rectangular configuration as bounded by the walls 16, 17 and 18.

Additionally, on the downstream edges of walls 16, 17 and 18 of each rectangular element 15, there are provided inturned lips or flanges extending partially into the respective opening 20. In particular, each bottom wall 16 is provided on its downstream edge with an inturned or upstanding flange 21, while each upstanding side wall 18 is provided on its downstream edge with an inturned lip or flange 22. Each top wall 17 is similarly provided with an inturned or depending flange, not shown in the drawings. The several flanges or inturned lips of each open rectangular body 15 may advantageously extend continuously about the respective opening 20, but may be of other construction, if desired.

The wall opening 13 may, on its downstream side, communicate with an exit duct 25, as illustrated.

Certain of the rectangularly configured bodies 15 are illustrated as empty, for example the leftmost upper and lower bodies as seen in FIG. 1, to better illustrate interior construction. However, in operation the bodies 15 are all occupied by filter elements, and in practice there may be a series of filter elements in each rectangular body, such as shown in FIG. 2, where is illustrated a downstream filter element 26, and an upstream filter element 27. That is, the downstream filter element is of a pervious sheet or pad material configured for conformable engagement in the opening 20 so as to extend completely thereacross with its downstream face 28 having its marginal edge portions toward and in facing engagement with the upstream surfaces of flange means 21, 22. If desired, there may be provided a supporting wirework grid 30 interposed between the filter element 26 and supporting flange means 21, 22. For example, under heavy fluid pressures such gridwork 30 may be preferred. Also, there may be provided an additional similar wirework grid 31 between filter elements 26 and 27, should conditions warrant.

The upstream filter element 27 may be substantially identical to the downstream filter element 26, or different, if desired, and advantageously extends entirely across the opening 20 between the walls of receiving body 15 and in facing engagement with the upstream side of filter element 26. The combined thicknesses of filter elements 26 and 27, or any number employed, together with that of any gridwork 30, 31, is such that the upstream face 32 of upstream filter element 27 is spaced inwardly or downstream from the upstream extremities of edges of walls 16, 17 and 18. This is best seen in FIG. 2.

Retaining the filter elements 26 and 27 in their operative position within the framework 12 are a plurality of retainers, as at 34 and 35. The retainer 34 may be employed along an outside wall of the framework 12, while a retainer 35 may be employed along an inside wall of the framework. Each of the retainers 34 may include a resilient clip or gripping means 36, say fabricated of spring material and assuming a generally U-shaped configuration constituted of an arcuate bight portion 37 and a pair of legs 38 and 39 extending from opposite ends of the bight portion. The outer or rightward leg 39, as seen in the drawings, may be generally straight for facing engagement with the outer surface of an outside wall 18. The leg 38 may have its end portion bent inwardly, as at 40, being located on the inner side of the adjacent wall 18, so that the U-shaped member 36 is astride the wall 18. An elongate holding member, strip or bar 41 extends along the inner surface of adjacent wall 18, being in facing, holding engagement with the adjacent marginal edge portion of filter element 27, and is fixedly secured, as by welding or other suitable means, to the clip leg 38, and specifically to the inturned leg end portion 40, extending transversely thereof. Further, the inner edge 42 of strip or bar 41, adjacent to leg 39, extends beyond the end portion 40, so that the edge 42 is in frictional bearing engagement with the inner surface of wall 18.

The retainers 35 may each include a resilient, generally U-shaped member or clip 46 having an intermediate arcuate or bight portion 47 extending at its opposite ends to define respective legs 48 and 49. The legs may each have their distal ends turned inward, as at 50 and 51, and each provided on the inturned end portion with an elongate holding member, strip or bar 52 and 53, respectively.

As best seen in FIG. 2, the retainer 35 is astride an interior framework wall 18, 18 with its legs 48 and 49 on opposite sides thereof in gripping relation therewith. The holding bars 52 and 53 are welded or otherwise suitably secured to respective inturned end portions 50 and 51, extending transversely thereof and have their inner edges 54 and 55 located inwardly beyond respective leg end portions 50 and 51 for frictional bearing engagement with respective adjacent surfaces of walls 18, 18. Thus, the holding bars 52 and 53 each extend longitudinally along a respective wall 18, in facing engagement with the marginal edge portion of a respective filter 27 and in frictional edge bearing engagement with the adjacent wall 18. The length of the holding members or bars 41, 52 and 53 may be slightly less than the interior dimension of the opening 20, so as to effectively retain the pad 27 against sagging, as under the weight of collected material.

Of course, removal and replacement of filter elements may be readily effected, by mere opening or distension of the resilient clips 36 and 46 for removal from their respective walls, and after removal and replacement of the desired filter elements, the clips may be distended and replaced in their operative, illustrated positions. According to the spring tension in clips 36 and 46, they may be manually withdrawn against the frictional bearing action of holding members 41, 52 and 53, without prior opening or distension, as for savings in replacement time.

From the foregoing it is seen that there is provided a unique filter bank construction affording the intended objects, and further that the retainers 34 and 35 are extremely simple and inherently durable in construction so as to be highly free from breakage and malfunction. Also, it can be readily appreciated that even when used with paint and similarly adhesive materials, the instant retainers are quickly and easily removable and replaceable without any adverse effect from difficult material being filtered.

Although the present invention has been described in some detail by way of illustration and example for purposes of clarity of understanding, it is understood that certain changes and modifications may be made within the spirit of the invention.

What is claimed is:

1. In a filter bank, the combination comprising a framework including a plurality of intersecting walls defining therebetween openings for receiving filter elements, internal flange means fixed in each opening for marginally engaging one face of the received filter element, holding means removably positioned in each opening for holding engagement with the other face of the received filter element substantially completely along opposite margins thereof and facing through said opposite margins toward said flange means for clamping a filter element in position, and releasable gripping means carried by said holding means for releasable gripping engagement with the walls of said framework for releasably retaining said holding means in said clamping relation.

2. The combination according to claim 1, said gripping means comprising a resilient clip releasably frictionally securing said holding means in holding position and distendable to release said holding means from said position.

3. The combination according to claim 1, said holding means comprising a holding bar removably extending along the adjacent framework wall for facing holding engagement with the edge margin of the associated filter element to sandwich the latter between said bar and flange means.

4. The combination according to claim 3, said gripping means comprising a resilient clip carried by said bar releasably securing the latter to said adjacent framework wall in said holding engagement and distensible to release said holding bar from said engagement.

5. The combination according to claim 1, said clip comprising a pair of legs resiliently biased toward each other for location on opposite sides of the adjacent framework wall in gripping relation therewith, one of said legs being secured to said bar for retaining the latter in said holding engagement.

6. The combination according to claim 5, said bar in said holding engagement being engageable with said adjacent framework wall to effect frictional securement in said holding engagement.

7. The combination according to claim 5, in combination with an additional holding bar removably positioned extending along the adjacent framework wall on the opposite side thereof as said first mentioned holding bar and in holding engagement substantially completely along one margin of another filter element, the other leg of said clip being secured to said additional bar for retaining the latter in position.

8. The combination according to claim 7, said additional bar in its filter element holding position being engageable with said adjacent framework wall for effecting additional frictional securement in said holding position.

9. The combination according to claim 8, said legs being spaced on opposite sides of said adjacent framework wall and resiliently urged toward each other, for convenient manual separation from each other to release said gripping relation.

* * * * *